April 6, 1965  W. KLEIN  3,176,583
WIDE FIELD MICROSCOPE OBJECTIVE
Filed Sept. 18, 1962  2 Sheets-Sheet 1
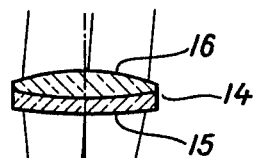
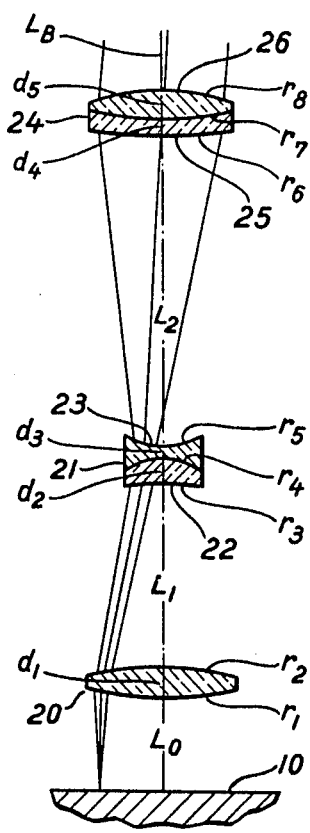
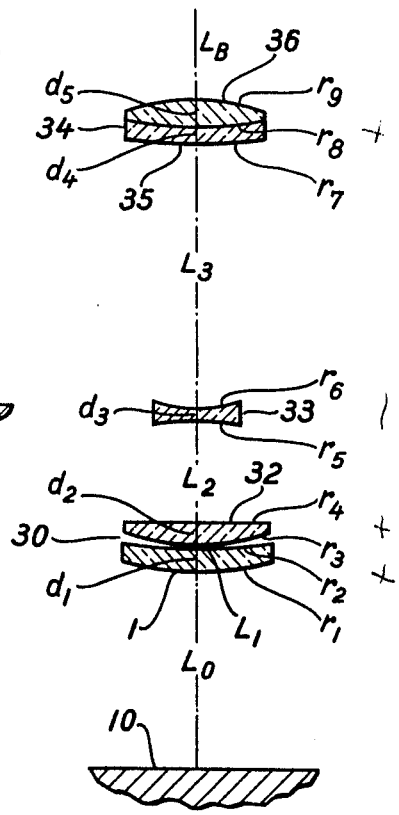
INVENTOR
Walter Klein
BY E. M. Squire
his attorney

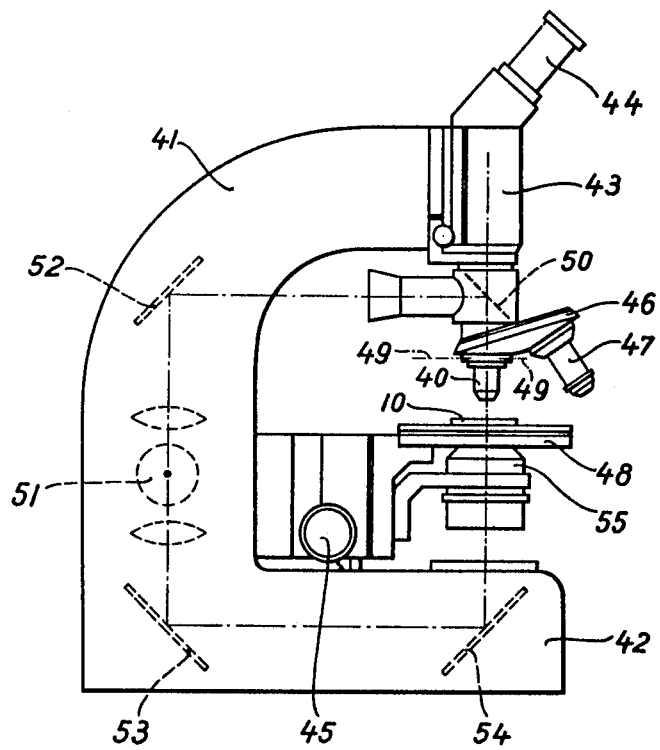

United States Patent Office 3,176,583
Patented Apr. 6, 1965

---

3,176,583
WIDE FIELD MICROSCOPE OBJECTIVE
Walter Klein, Wissmar uber Wetzlar (Lahn), Germany, assignor to Ernst Leitz G.m.b.H., Wetzlar, Germany
Filed Sept. 18, 1962, Ser. No. 224,447
Claims priority, application Germany, July 21, 1954,
L 19,427
6 Claims. (Cl. 88—57)

This application is a continuation-in-part of my copending application Serial No. 523,062 filed July 19, 1955, now abandoned.

The present invention leads to a weak microscopic lens which can be used as one of the objective lenses on the turret of a microscope.

In microscopy it is desirable to have a weak objective available in order to be able to view relatively large object fields. Despite the large focal length it is desirable to arrange such a weak lens together with the stronger objectives on the same microscope turret. All the objectives used, however, should be so constructed that focus is maintained upon the changing of the objectives. This result can be obtained by the use of teleobjective lenses as long focal length objective lenses, the positive member on the image side of the objective lens, being placed approximately at the abutment surface or shoulder of the objective which bears against the turret and which occupies an operative position common to all of the objective lens units.

Upon change of the objective lenses from low magnification to high magnification it is desirable to return not only the focusing but also the illumination of the object without it being necessary to effect any adjustment of the illuminating means. Weak objectives which are constructed as telesystems, however, require special illuminating devices as compared with strong objectives. In the case of transillumination a special condenser must ordinarily be used for these "low-power objectives." This condenser is so constructed that it collects the rays of light in the negative front lens of the telesystem. In the case of direct or surface illumination of the object through the objective from the direction of observation, the difficulties with regard to illumination in the case of telesystems are much greater than in the case of transillumination since the objectives themselves act as condensers. These illuminating devices collect the light in the vicinity of the abutment surfaces of the objectives (illumination pupils). In the case of strong objective lenses, the illuminating light, after the forming of an image of the light source by the objective lens, is reflected by the object back into the objective lens. FIGURE 1 shows that in the case of conventional inverted telephoto or telesystems, the rays which pass through the edge of the field of view are not reflected back into the objective lens.

In accordance with the present invention, the above described defects of the illumination can be avoided, as will be described in detail below.

In order that, in the case of direct illumination, the illuminating light rays, after impinging on the object, are reflected back into the objective lens, it is advantageous that the principal rays, i.e. the central rays of the light beam which impinge upon any given point on the object extend substantially parallel to each other within each bundle at the object side of the objective. The light beams, shown in FIGURE 2, will thus, after reflection by the object, be reflected back in the direction of arrival. The principal rays also pass through the center of the illumination pupil. In places where the illumination rays extend substantially parallel to each other, the ray path is termed a "telecentric ray path." Such a telecentric ray path between the objective lens and the object is obtained if the focal plane of an objective lens at the image side is at the same time its exit pupil. A good illumination of the entire field is obtained if the source of light is imaged at the exit pupils of the objective lenses and therefore in the focal plane on the image sides of the objective lenses. Since in the case of direct illumination an imaging of the source of light is present, the rear focal planes of all of the objectives, when operative, must lie insofar as possible in one and the same plane. Transillumination systems, in the case of microscopes, are also so designed that a telecentric ray path is present between the object and the objective.

In accordance with the present invention, a weak matched objective with a telecentric ray path at the object side is obtained if a positive lens member is added to a telesystem at the object side.

The present invention will be more readily understood from the following explanations and drawings.

FIGURE 1 is a conventional inverted telephoto or telelens objective, shown schematically in longitudinal section.

FIGURE 2 is a similar section which shows one embodiment of a microscope objective in accordance with the invention.

FIGURE 3 shows a second embodiment of the invention.

FIGURE 4 is a side view of a microscope which is equipped with a weak, wide field, matched objective in accordance with FIG. 2 or FIG. 3.

Referring to FIG. 1, an object 10 is to be observed by means of a teleobjective system. There is provided a lower compound negative lens designated generally as 11 and consisting of a lower concavo-convex positive lens 12 cemented to an upper double concave lens 13. Disposed above the lower compound lens 11 is an upper compound lens 14 which consists of a lower concavo-convex negative lens 15 cemented to an upper double convex lens 16.

The upper lens 14 is arranged at or near the exit pupil of the lens system at the upper end of the tube. The divergent light illuminating rays indicated at 17, reflected from the object 10, are not directed toward the lower compound objective lens 11 and therefore lost. The effective intensity of illumination is thereby reduced.

As shown in FIG. 2, the teleobjective system according to the present invention is combined with a positive lens system arranged between the telelens system and the object. As indicated in FIG. 2 the principal light rays within each bundle are given parallel directions by the positive lens system and upon reflection by the object they are retroflectively redirected into the negative lens. I have discovered that when I make the distance between the positive lens system and the object very small, dust particles present thereon will become visible in the microscope. In order to overcome this drawback, the objective lens system of the present invention is advantageously so arranged that the positive lens system is disposed approximately at a distance from the object that is greater than half the distance between the negative lens and the object, as shown in FIG. 3. In this form of construction it is desirable that the teleobjective system shall possess a very long focal length or that it be nearly afocal. I have also found that in order to prevent reflected ghost image, it is desirable to construct the positive lens system so that the centers of curvature of the optical surfaces of shortest radius of curvature within the positive system are disposed toward the teleobjective system.

The objective lens system of FIG. 2 comprises a positive system consisting of a simple double convex positive lens 20 disposed at a relatively short distance $L_0$ from the object 10. The positive lens 20 is disposed below a lower compound negative lens designated generally as 21 which consists of a lower concavo-convex positive lens 22 cemented to an upper double concave lens 23. Disposed above lower negative compound lens 21 at the image side of the telelens system there is an upper compound positive lens designated generally as 24 and which consists of a lower concavo-convex positive lens 25 cemented to an upper double convex positive lens 26. The negative and positive cemented compound lenses 21 and 24 constitute the teleobjective system and the simple double convex positive lens 20, in this instance, constitutes the positive system which is disposed at the object side of the teleobjective system.

In FIG. 3, the positive system is designated generally as 30 and consists of a lower concavo-convex positive lens closely spaced at a distance $L_1$ below an upper planoconvex positive lens 32. The teleobjective system consists of a lower simple double concave negative lens 33 and an upper compound positive lens designated generally as 34. The upper compound positive lens 34 consists of a lower concavo-convex negative lens 35 cemented to an upper double convex lens 36.

It will be observed in FIG. 3 that the distance $L_0$ from the object 10 to the positive lens system 30 is greater than one-half the distance $(L_0+L_1+L_2)$ from the object 10 to the negative lens 33 of the teleobjective system for preventing very small dust particles from being visible in the microscope. In other words, the positive lens system is closer to the negative lens 33 than to the object.

It will be further observed that the center of curvature of the lower surface of plano-convex lens 32 which has the most highly curved surface of the positive lens system 30 lies on the side of the positive system 30 toward the teleobjective system 33–34 for the prevention of reflected ghost images.

The following tables, I and II, represent fully computed examples of constructions according to FIGS. 2 and 3, respectively. In these tables, $r$ represents the radii; L the distances referred to; $L_B$ the distance of the image; $d$ the thickness of the lenses; $f_e$ the focal lengths and $n/v$ the index of refraction and dispersion of each of the several types of glass employed. All linear dimensions are expressed in millimeters.

Table I

[$f_e = 79.7118$]

| | | $n_d/v$ |
|---|---|---|
| $r_1=+19.51$ | $L_0=6.17209$ | |
| | $d_1=2.0$ | 1.6163/64.0 |
| $r_2=-19.51$ | $L_1=11.96$ | |
| $r_3=-21.417$ | | |
| | $d_2=1.5$ | 1.7618/26.5 |
| $r_4=-3.83$ | | |
| | $d_3=0.7$ | 1.5725/57.5 |
| $r_5=+3.83$ | | |
| | $L_2=20.53$ | |
| $r_6=+98.0$ | | |
| | $d_4=0.9$ | 1.7618/26.5 |
| $r_7=+18.1$ | | |
| | $d_5=2.0$ | 1.5014/56.5 |
| $r_8=-12.0$ | | |
| | $L_B=\infty$ | |

Table II

[$f_e = 50.2950$]

| | | $n_d/v$ |
|---|---|---|
| $r_1=+19.67$ | $L_0=12.7108$ | |
| | $d_1=1.5$ | 1.6910/54.8 |
| $r_2=+50.0$ | | |
| | $L_1=0.2$ | |
| $r_3=+14.0$ | | |
| | $d_2=1.5$ | 1.7618/26.5 |
| $r_4=\infty$ | | |
| | $L_2=6.5$ | |
| $r_5=-21.72$ | | |
| | $d_3=1.0$ | 1.6889/31.1 |
| $r_6=+6.5$ | | |
| | $L_3=17.6$ | |
| $r_7=+78.04$ | | |
| | $d_4=0.7$ | 1.7618/26.5 |
| $r_8=+17.9$ | | |
| | $d_5=2.2$ | 1.5231/50.9 |
| $r_9=-12.8$ | | |
| | $L_B=\infty$ | |

As shown in FIG. 4, the wide field objective lens system of FIG. 2 or FIG. 3 may be advantageously mounted in an objective lens tube 40 of a microscope designated generally as 41. The microscope 41 is shown comprising a supporting stand 42 upon which a body tube 43 is mounted. The body tube 43 is provided with an eyepiece 44 at its upper end. A focusing adjustment knob 45 is provided for focusing the image. The objective tube 40 is threadedly secured in a revoluble nose piece or carrier 46. Also threadedly secured in the revoluble nose piece 46 is a relatively high power objective lens system disposed within a tube 47.

The object 10 is shown supported on an adjustable platform 48 carried by the base portion of the stand 42. By rotation of the nose piece 46, either the wide field objective lens system disposed in tube 40 or the high power objective lens system in tube 47 may be used for viewing the object 10. In accordance with the invention, the focal planes of both objective lens systems in tubes 40 and 47, when placed in operative position, are both located substantially at an imaginary plane 49—49 extending transversely with respect to the body tube 43 at the abutment surfaces of the objectives 40 and 47. This minimizes the amount of refocusing adjustment required when changing from the wide field objective lens system in tube 40 to the high power objective lens system in tube 47. 50 designates a semitransparent mirror for incident or direct illumination; 51 a lamp; 52 a mirror. For transillumination, there are provided the same lamp 51, mirrors 53, 54 and a condenser 55.

What is claimed is:

1. A microscopic objective for obtaining an image of a relatively large part of an object, comprising, in combination, a biconvex lens, a first double lens arranged at a distance from said biconvex lens, and a second double lens arranged opposite to said biconvex lens at a distance from said first double lens, the distances between said biconvex lens and the object, said first double lens and said biconvex lens, and said first and second double lenses amounting, respectively, to substantially 6.17209 mm., 11.96 mm., and 20.53 mm. said biconvex lens having a thickness amounting substantially to 2.0 mm. and being limited by spherical surfaces having, respectively, radii amounting to substantially +19.51 mm. and −19.51 mm., said biconvex lens consisting of glass having a mean index of refraction amounting substantially to 1.5163 and a dispersion amounting substantially to 64.0, said first double lens including a meniscus and a biconcave lens cemented to each other, said meniscus having a thickness amounting substantially to 1.5 mm. and being limited by spherical surfaces having, respectively, radii amounting to substantially −21.417 mm. and −3.83 mm., said meniscus consisting of glass having a mean index of refraction amounting substantially to 1.7618 and a dispersion amounting substantially to 26.5, said biconcave lens having a thickness amounting substantially to 0.7 mm., and being limited on the side thereof turning away from said meniscus by a spherical surface having a radius amounting substantially to +3.83 mm., said biconcave lens consisting of glass having a mean index of refraction amounting substantially to 1.5725 and a dispersion amounting substantially to 57.5, said second double lens including a second meniscus and a second biconvex lens cemented to each other, said second meniscus having a thickness amounting substantially to 0.9 mm. and being limited by spherical surfaces having, respectively, radii amounting substantially to +98.0 mm. and +18.1 mm., said second meniscus consisting of glass having a mean index of refraction amounting substantially to 1.7618 and a dispersion amounting substantially to 26.5, said second biconvex lens having a thickness amounting substantially to 2.0 mm. and being limited on the side thereof turning away from said second meniscus by a spherical surface having a radius amounting substantially to −12.0 mm., said second biconvex lens consisting of glass having a mean index of refraction amounting substantially to 1.5014 and a dispersion amounting substantially to 56.5, said biconvex lens and said first and second double lenses forming an optical system having an equivalent focal length amounting substantially to 79.7118 mm.

2. A microscopic objective for obtaining an image of a relatively large part of an object, comprising, in combination a lens system arranged at a distance amounting substantially to 12.7108 mm. from the object, said lens system including a meniscus and a plano-convex lens arranged at a distance amounting substantially to 0.2 mm. from each other, said meniscus having a thickness amounting substantially to 1.5 mm. and being limited by spherical surfaces having, respectively, radii amounting substantially to +19.67 mm. and +50.0 mm., said meniscus consisting of glass having a mean index of refraction amounting substantially to 1.6910 and a dispersion amounting substantially to 54.8, said plano-convex lens having a thickness amounting substantially to 1.5 mm. and being limited on the side thereof turning toward said meniscus by a spherical surface having a radius amounting substantially to +14.0 mm., said plano-convex lens consisting of glass having a mean index of refraction amounting substantially to 1.7618 and a dispersion amounting substantially to 26.5, simple biconcave lens arranged at a distance amounting substantially to 6.5 mm. from the plane surface of said plano-convex lens, said simple biconcave lens having a thickness amounting substantially to 1.0 mm. and being limited by spherical surfaces having, respectively, radii amounting substantially to −21.72 mm. and +6.5 mm., said simple biconcave lens consisting of glass having a mean index of refraction amounting substantially to 1.6889 and a dispersion amounting substantially to 31.1, and a double lens arranged on the side of said spherical surface of radius +6.5 mm. of said simple biconcave lens at a distance amounting substantially to 17.6 mm., said double lens including a second meniscus and a biconvex lens cemented to each other, said second meniscus having a thickness amounting substantially to 0.7 mm. and being limited by spherical surfaces having, respectively, radii amounting substantially to +78.04 mm. and +17.9 mm., said second meniscus consisting of glass having a mean index of refraction amounting substantially to 1.7618 and a dispersion amounting substantially to 26.5, said biconvex lens cemented to said second meniscus having a thickness amounting substantially to 2.2 mm. and a free spherical surface having a radius amounting substantially to −12.8 mm., said biconvex lens consisting of glass having a mean index of refraction amounting substantially to 1.5231 and a dispersion amounting substantially to 50.9, said lens system, said simple biconcave lens and said double lens forming an optical system having an equivalent focal length amounting substantially to 50.2950 mm.

3. A wide field microscope objective for focusing the image of an object at a predetermined focal plane spaced from said object, said object being illuminated by light passing through said objective to said object, said objective comprising: negative lens means located between said plane and said object; first positive lens means located between said negative lens means and said plane, said negative lens means and said first positive lens means being dimensioned to constitute a telelens system; and second positive lens means positioned between said negative lens means and said object, said second positive lens means being dimensioned to render illuminating light rays passing through said telelens system to said object substantially parallel within each bundle, whereby said rays are retroflectively reflected from said object back into said second positive lens means, all of said lens means being dimensioned to form a real image of said object at said plane.

4. A wide field microscope objective for focusing the image of an object at a focal plane spaced from said object, said object being illuminated by light passing through said objective to said object, said objective comprising: negative lens means positioned between said object and said plane; first positive lens means positioned between said negative lens means and said plane, said negative lens means and said first positive lens means being dimensioned to constitute a telelens system; and second positive lens means, said second positive lens means being located closer to said negative lens means than to said object, said second positive lens means being dimensioned to render illuminating light rays passing through said telelens system to said object substantially parallel with each bundle, whereby said rays are retroflectively reflected from said object back into said second positive lens means, all of said lens means being dimensioned to form a real image of said object at said plane.

5. A wide field microscope objective for focusing the image of an object at a focal plane spaced from said object, said object being illuminated by light passing through said objective to said object, said objective comprising: negative lens means positioned between said object and said plane; first positive lens means positioned between said negative lens means and said plane, said negative lens means and said first positive lens means being dimensioned to constitute a telelens system; and second positive lens means comprising a plurality of lenses having optical surfaces of differing radii of curvature, the centers of curvature of the surfaces having the lesser radii of curvature being located between said second positive lens means and said plane, said second positive lens means being dimensioned to render illuminating light rays passing through said telelens system to said object substantially parallel within each bundle, whereby said rays are retroflectively reflected from said object back into said second positive lens means, all of said lens means being dimensioned to form a real image of said object at said plane.

6. A wide field microscope objective for focusing the image of an object at a focal plane spaced from said object, said object being illuminated by light passing through said objective to said object, said objective comprising: negative lens means positioned between said object and said plane; first positive lens means positioned between said negative lens means and said plane, said negative lens means and said first positive lens means being dimensioned to constitute a telelens system; and second positive lens means comprising a plurality of lenses having optical surfaces of differing radii of curvature, the centers of curvature of the surfaces having the lesser radii of curvature being located between said second positive lens means and said plane, said second positive lens means being located closer to said negative lens means than to said object, said second positive lens means being dimensioned to render illuminating light rays passing through said telelens system to said object substantially parallel within each bundle, whereby said rays are retroflectively reflected from said object back into said second positive lens means, all of said lens means being dimensioned to form a real image of said object at said plane.

References Cited by the Examiner
UNITED STATES PATENTS 2,146,506   2/39   Maisch ------------------ 88—39
2,791,937   5/57   Leitz et al.

JEWELL H. PEDERSEN, *Primary Examiner.*